United States Patent
Guo et al.

(10) Patent No.: US 9,401,709 B2
(45) Date of Patent: Jul. 26, 2016

(54) CONTROL CIRCUIT FOR MANAGEMENT ENGINE INTERFACE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Song Guo, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 14/541,837

(22) Filed: Nov. 14, 2014

(65) Prior Publication Data

US 2015/0188535 A1    Jul. 2, 2015

(30) Foreign Application Priority Data

Dec. 27, 2013 (CN) .......................... 2013 1 0734479

(51) Int. Cl.
    *H03K 17/60* (2006.01)
(52) U.S. Cl.
    CPC ..................................... *H03K 17/60* (2013.01)
(58) Field of Classification Search
    CPC ........................... H03K 17/602; H03K 17/603
    See application file for complete search history.

(56) References Cited

U.S. PATENT DOCUMENTS

| 7,667,503 B2 * | 2/2010 | Kadowaki | H03K 17/30 326/84 |
| 8,570,092 B2 * | 10/2013 | Li | G01R 31/318572 327/427 |

* cited by examiner

*Primary Examiner* — Hai L Nguyen
(74) *Attorney, Agent, or Firm* — ScienBiziP, P.C.

(57) ABSTRACT

A control circuit includes a platform controller hub (PCH), a basic input/output system (BIOS), an electronic switch, and first and second resistors. A management engine interface is loaded in the PCH. The BIOS is connected to the PCH to control the signals output from a general input/output (GPIO) pin of the PCH. A power supply is connected to a serial pin of the PCH through the electronic switch. The GPIO pin of the PCH controls on or off of the electronic switch.

2 Claims, 1 Drawing Sheet

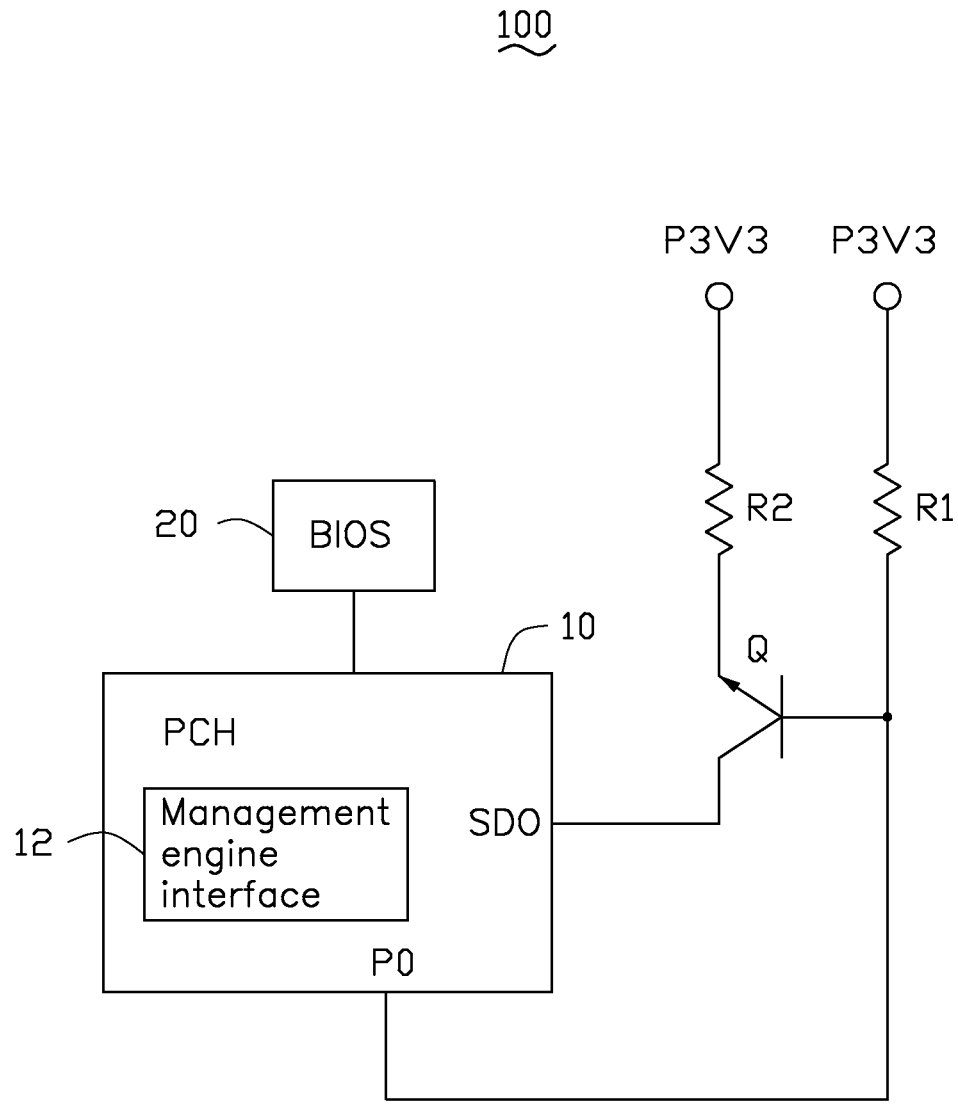

CONTROL CIRCUIT FOR MANAGEMENT ENGINE INTERFACE

FIELD

The subject matter herein generally relates to control circuits for management engine interface.

BACKGROUND

Management engine interface, which is loaded in a platform controller hub (PCH), is usually protected for safety. This can be problematic when the management engine interface needs to be updated.

BRIEF DESCRIPTION OF THE DRAWING

Implementations of the present technology will now be described, by way of example only, with reference to the attached figure.

The figure is a circuit diagram of an embodiment of a control circuit for management engine interface.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a control circuit 100.

The figure illustrates an embodiment of the control circuit 100. The control circuit 100 can comprise a platform controller hub (PCH) 10, a basic input-output system (BIOS) 20, an electronic switch Q, a resistor R1, and a resistor R2.

A management engine interface 12 is loaded in the PCH 10. The BIOS 20 is coupled to the PCH 10. An outputted signal of a general purpose input output (GPIO) pin P0 of the PCH 10 is controlled by the BIOS 20. The GPIO pin P0 of the PCH 10 is coupled to a power supply P3V3 through the resistor R1. A control terminal of the electronic switch Q is coupled to the GPIO pin P0 of the PCH 10. A first terminal of the electronic switch Q is coupled to a serial pin SDO of the PCH 10. A second terminal of the electronic switch Q is coupled to the power supply P3V3 through the resistor R2.

The BIOS 20 controls the GPIO pin P0 of the PCH 10 to output a low level signal when the management engine interface 12 needs to be updated. The electronic switch Q is turned off. The serial pin SDO of the PCH 10 receives no signal. Write protect function of the management engine interface 12 is opened. Then the management engine interface 12 can be updated.

No signal is outputted from the GPIO pin P0 of the PCH 10 when the management engine interface 12 is normal and no update is required. The electronic switch Q receives a high level signal from the power supply P3V3 and is turned on. The serial pin SDO of the PCH 10 receives a high level signal and the management engine interface 12 is in a state of being protected.

In at least one embodiment, the electronic switch Q can be an NPN bipolar junction transistor.

The embodiment shown and described above is only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A control circuit for a management engine interface, the control circuit comprising:
   a platform controller hub (PCH);
   a management engine interface loaded in the PCH;
   a basic input-output system (BIOS) coupled to the PCH and controlling an outputted signal of a general purpose input output (GPIO) pin of the PCH;
   a first resistor;
   a second resistor; and
   a electronic switch;
   wherein the GPIO pin of the PCH is coupled to a power supply through the first resistor; and
   wherein a control terminal of the electronic switch is coupled to the GPIO pin of the PCH, a first terminal of the electronic switch is coupled to a serial pin of the PCH, and a second terminal of the electronic switch is coupled to the power supply through the second resistor.

2. The control circuit of claim 1, wherein the electronic switch is an NPN bipolar junction transistor.

* * * * *